(12) United States Patent
Lim et al.

(10) Patent No.: US 7,868,993 B2
(45) Date of Patent: Jan. 11, 2011

(54) METHOD FOR REPAIRING DEFECTIVE CELL OF LIQUID CRYSTAL PANEL

(75) Inventors: Eun-Sub Lim, Daegu (KR); Chang-Seok Geum, Gyeongsangbuk-Do (KR)

(73) Assignee: LG Display Co., Ltd., Seoul (KR)

( * ) Notice: Subject to any disclaimer, the term of this patent is extended or adjusted under 35 U.S.C. 154(b) by 200 days.

(21) Appl. No.: 12/230,537

(22) Filed: Aug. 29, 2008

(65) Prior Publication Data
US 2009/0141231 A1  Jun. 4, 2009

(30) Foreign Application Priority Data
Nov. 30, 2007 (KR) .................. 10-2007-0123873

(51) Int. Cl.
*G02F 1/1333* (2006.01)
(52) U.S. Cl. ......................... 349/192; 349/187
(58) Field of Classification Search ............ 349/187, 349/192
See application file for complete search history.

(56) References Cited

U.S. PATENT DOCUMENTS

| | | | |
|---|---|---|---|
| 7,414,697 B1 * | 8/2008 | Choi et al. ................. | 349/192 |
| 7,499,140 B2 * | 3/2009 | Nakagawa et al. ......... | 349/143 |
| 7,502,094 B2 * | 3/2009 | Son ........................... | 349/192 |
| 7,612,863 B2 * | 11/2009 | Kim et al. ................. | 349/192 |
| 7,636,148 B2 * | 12/2009 | Yoo et al. .................. | 349/192 |
| 2006/0092372 A1 * | 5/2006 | Kim et al. ................. | 349/192 |
| 2006/0126003 A1 * | 6/2006 | Yoo et al. .................. | 349/192 |
| 2006/0181672 A1 * | 8/2006 | Son ........................... | 349/192 |
| 2007/0263134 A1 * | 11/2007 | Kim et al. ................. | 349/54 |
| 2008/0143914 A1 * | 6/2008 | Nakagawa et al. ......... | 349/55 |
| 2008/0192165 A1 * | 8/2008 | Nakagawa et al. ......... | 349/55 |
| 2008/0286528 A1 * | 11/2008 | Yoshioka et al. .......... | 428/156 |
| 2009/0015745 A1 * | 1/2009 | Nakagawa et al. ......... | 349/39 |
| 2010/0141849 A1 * | 6/2010 | Enda et al. ................ | 348/731 |

* cited by examiner

*Primary Examiner*—K. Cyrus Kianni
(74) *Attorney, Agent, or Firm*—Morgan Lewis & Bockius LLP

(57) ABSTRACT

A method for repairing a defective cell of a liquid crystal panel includes: providing a liquid crystal panel including an upper array substrate with a black matrix and a pigment layer formed thereon, a lower array substrate with a thin film transistor and attached with the upper array substrate, and a liquid crystal layer formed between the upper and lower substrates and including a plurality of cells; forming a certain gap between the black matrix and the upper array substrate by irradiating laser to a defective cell region among the plurality of cells in the liquid crystal panel; forming a comb-like structure with a certain gap between its teeth between the pigment layer and the upper array substrate by irradiating laser to the defective cell region; processing the black matrix by irradiating laser to the defective cell region to generate black matrix particles; and dispersing the black matrix particles between the pigment layer and the upper array substrate, by irradiating laser to the defective cell region, such that the black matrix particles fills the gap between the pigment layer and the comb-like structure.

19 Claims, 15 Drawing Sheets

FIG. 5

| PROCESSING CONDITIONS | FORMING BLACK MATRIX/PIGMENT GAP | | PROCESSING BLACK MATRIX | | | DISPERSING BLACK MATRIX PARTICLES | | | |
|---|---|---|---|---|---|---|---|---|---|
| PROCESSING STEP | 1 | 2 | 3 | 4 | 5 | 6 | 7 | 8 | 9 |
| SLIT SIZE (X,Y: $\mu m$) | 5~20 (15×15) | 5~30 (20×30) | 8~20 (11×11, 15×15) | | | 5~20 (10×10, 12×12) | | | |
| SCANNING SPEED ($\mu m/S$) | 30~70 (30,50) | 20~50 (25,30) | 25~45 (25,30) | | | 20~45 (25,30) | | | |
| POWER LEVEL ($\mu J$) | 100~470 (280) | 200~620 (340) | 200~600 (320) | | | 180~420 (300) | | | |

METHOD FOR REPAIRING DEFECTIVE CELL OF LIQUID CRYSTAL PANEL

This application claims the benefit of Korea Patent Application No. 10-2007-0123873 filed on Nov. 30, 2007, which is hereby incorporated by reference in its entirety.

BACKGROUND OF THE INVENTION

1. Field of the Invention

The present invention relates to a method for repairing a liquid crystal panel and, more particularly, to a method for repairing a defective cell of a liquid crystal panel.

2. Description of the Related Art

Recently, a liquid crystal display (LCD) receives much attention as a next-generation advanced display device which has low power consumption, has good portability, is technology-intensive, and has high added value.

In general, in order to use liquid crystal for a display, liquid crystal cells should be formed. The liquid crystal cells are formed by filling liquid crystal between two glass substrates or between transparent plastic substrates.

In order to apply a voltage to the liquid crystal, transparent electrodes (common electrode and pixel electrode) are formed on the substrates, and the transparent electrodes serve to control an ON/OFF operation by applying the voltage to the liquid crystal.

Namely, light transmittance of the LCD is controlled by the voltage applied to the transparent electrode, and characters/images are displayed according to a light shutter effect.

Among the LCDs, an active matrix type LCD having switching elements for controlling ON/OFF operations of voltage by pixels is spotlighted with its high resolution and good video implementation capabilities.

The active matrix type LCD includes a liquid crystal panel in which liquid crystal cells are arranged in a matrix form and driving circuits for driving the liquid crystal panel.

The LCD is divided into a TN (Twisted Nematic) mode LCD using vertical fields and an IPS (In-Plane Switching) mode LCD using in-plane fields according to the field direction.

Here, the TN mode LCD, in which liquid crystal is driven by vertical fields between pixel electrodes and common electrodes disposed in a facing manner on the upper substrate, is advantageous in that it has a large aperture ratio, but disadvantageous in that its viewing angle is narrow.

The IPS mode LCD, in which liquid crystal is driven by in-plane fields between the pixel electrodes and the common electrodes disposed in parallel on the lower substrate, is advantageous in that its viewing angle is wide but disadvantageous in that it has a small aperture ratio.

The related art method for repairing a defective cell based on the structure of the TN mode LCD, among the several modes of LCDs, will now be described with reference to FIG. 1.

FIG. 1 is a sectional view of the LCD used for explaining the method for repairing a defective cell of the LCD according to the related art.

A liquid crystal panel 10 of the related art LCD includes an upper array substrate 21 (i.e., a color filter array substrate) comprised of black matrixes 23, color filters 25a, 25b and 25c, an overcoat layer 27, a common electrode 29, and a upper alignment layer (not shown) sequentially formed thereon; a lower array substrate 11 comprised of TFTs 15, pixel electrodes (not shown) and a lower alignment layer (not shown) formed thereon; and liquid crystal 41 injected in an inner space between the upper array substrate 21 and the lower array substrate 11.

Here, the black matrixes 23 are formed on the upper array substrate 21 such that they correspond the TFT region and regions of gate lines and data lines of the lower array substrate 11, and prepare cell regions where the color filters 25a, 25b and 25c are formed.

Further, the black matrixes 23 prevent a light leakage and enhance the contrast by absorbing external light, and the color filters 25a, 25b and 25c are formed at the cell region separated by the black matrixes 23 and on the black matrixes 23.

The color filters 25a, 25b and 25c are formed by R, G and B to implement R, G and B colors, and a common voltage is supplied to the common electrode 29 to control the arrangement of liquid crystals. A spacer (not shown) serves to maintain a cell gap between the upper array substrates 21 and the lower array substrate 11.

Although not shown, each TFT 15 includes a gate electrode formed with a gate line (not shown) on the lower substrate 11, a semiconductor layer (not shown) overlapping with a gate insulating layer (not shown) formed on the gate electrode (not shown), and source and drain electrodes (not shown) formed with a data line (not shown) on the semiconductor (not shown).

The TFT 15 supplies a pixel signal from the date line to a pixel electrode (not shown) in response to a scan signal from the gate line. The pixel electrode (not shown) made of a transparent conductive material with high light transmittance contacts with the drain electrode (not shown) of the TFT with a passivation layer (not shown) interposed therebetween. The upper and lower alignment layers (not shown) for liquid crystal alignment are formed by coating an alignment material and then rubbing it.

To inspect the related art liquid crystal panel with such a structure, a test pattern (not shown) is run on a screen of the liquid crystal panel 10 and it is checked whether or not there is a defective pixel. If a defective pixel is discovered, a repairing operation is performed.

In this case, the defects of the liquid crystal panel 10 includes a color deficiency of each pixel cell, point defects such as bright spots (i.e., a cell which is always turned on), dark spots (blind spots) (a cell which is always turned off), line defects caused by shorts between the gate wirings (not shown) and the data wirings (not shown), and the like.

The defects are clearly seen to an operator (worker) when the test patterns are displayed on the liquid crystal panel 10, and the operator recognizes positions of defective pixels and perform repairing thereon.

Although not shown, when a black pattern is run on the screen, a darkening (blackening, or making dark spots) process is performed to repairing defective cells appearing as bright spots because of a short deficiency, signal deficiency, etc.

In the related art, in order to repair bright spots, a method in which a pixel electrode of a defective cell is welded by laser to the gate wiring, and a portion of the pixel electrode is cut to make a gate voltage applied to the gate wiring remain at the defective cell, is typically used.

Meanwhile, if a thin film of the upper or lower array substrates is defective, repairing is performed by using rework or laser, and in this case, if there is a foreign material (D) between thin films of the upper and lower array substrates to generate a defective cell, repairing by rework or laser is not easy.

With such a foreign material, the upper alignment layer positioned to correspond to the foreign material is not uniformly rubbed during a rubbing process, resulting in a non-uniform alignment region in the liquid crystal panel.

Then, a light leakage occurs at the non-uniform alignment region in the liquid crystal panel, which deteriorates light transmittance of liquid crystal to cause bright spots to appear on the liquid crystal panel.

SUMMARY OF THE INVENTION

Therefore, in order to address the above matters the various features described herein have been conceived. One aspect of the exemplary embodiments is to provide a method for repairing a defective cell of a liquid crystal panel by darkening pixels at the defective cell region through laser processing and by destroying an alignment layer of the defective cell region.

Another aspect of the present invention is to provide a method for repairing a defective cell of a liquid crystal panel capable of effectively repairing pixels with a bright spot deficiency through laser processing to thus improve a production yield and reduce a fabrication unit cost.

This specification provides a method for repairing a defective cell of a liquid crystal panel, including: providing a liquid crystal panel including an upper array substrate with a black matrix and a pigment layer formed thereon, a lower array substrate with a thin film transistor and attached with the upper array substrate, and a liquid crystal layer formed between the upper and lower substrates and including a plurality of cells; forming a certain gap between the black matrix and the upper array substrate by irradiating laser to a defective cell region among the plurality of cells in the liquid crystal panel; forming a comb-like structure with a certain gap between its teeth between the pigment layer and the upper array substrate by irradiating laser to the defective cell region; processing the black matrix by irradiating laser to the defective cell region to generate black matrix particles; and dispersing the black matrix particles between the pigment layer and the upper array substrate, by irradiating laser to the defective cell region, such that the black matrix particles fills the gaps between the teeth between the pigment layer and the comb-like structure.

This specification also provides a method for repairing a defective cell of a liquid crystal panel, including: providing a liquid crystal panel including an upper array substrate with a black matrix and a pigment layer formed thereon, a lower array substrate with a thin film transistor and attached with the upper array substrate, and a liquid crystal layer formed between the upper and lower substrates and including a plurality of cells; irradiating laser to a defective cell region among the plurality of cells in the liquid crystal panel to form a certain gap between the black matrix and the upper array substrate; irradiating laser to the defective cell region to form a comb-like structure with a certain gap between its teeth between the pigment layer and the upper array substrate; irradiating laser to the defective cell region to process the black matrix to generate black matrix particles; and irradiating laser to the defective cell region to disperse the black matrix particles so as to be filled in the gaps between the teeth of the comb-like structure between the pigment layer and the upper array substrate.

The method for repairing a defective cell of a liquid crystal panel has the following advantages.

First, the pressure is reduced by forming a gap at the black matrix through laser irradiation at the first step, the comb-like structure with a gap between its teeth is formed by applying a pigment through laser irradiation at the second step, the black matrix particles are generated by processing the black matrix through laser irradiation at the third step, the black matrix particles are filled in the comb-like structure of the pigment through laser irradiation at the fourth step, and the black matrix particles are dispersed to be uniformly distributed to the comb-like structure of the pigment through laser irradiation at the fifth step, to thereby repair the defective cell for darkening.

That is, because the comb-like structure is formed by separating the pigment from the substrate and a portion of the ambient black matrixes are granulated and filled in the comb-like structure, the pixels having bright spots can be effectively darkened.

In addition, the comb-like structure is formed by separating the pigment from the substrate, a portion of the ambient black matrixes are granulated and filled in the comb-like structure, and the alignment layer of a defective pixel region is destroyed by using a ultraviolet ray source to scatter light transferred from a light guide plate, to thereby reliably darkening defective pixels.

Thus, the method for repairing a defective cell of a liquid crystal panel according to the present invention can improve the production yield of a liquid crystal display by repairing the pixels with bright spots, reduce the fabrication unit cost, and improve the quality of the liquid crystal display.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5 shows a table of process conditions applied for the process of repairing a defective cell of a liquid crystal panel according to one exemplary embodiment of the present invention;

DETAILED DESCRIPTION OF THE INVENTION

A method for repairing a defective cell of a liquid crystal panel according to an exemplary embodiment of the present invention will now be described in detail with reference to the accompanying drawings.

Figure 1:
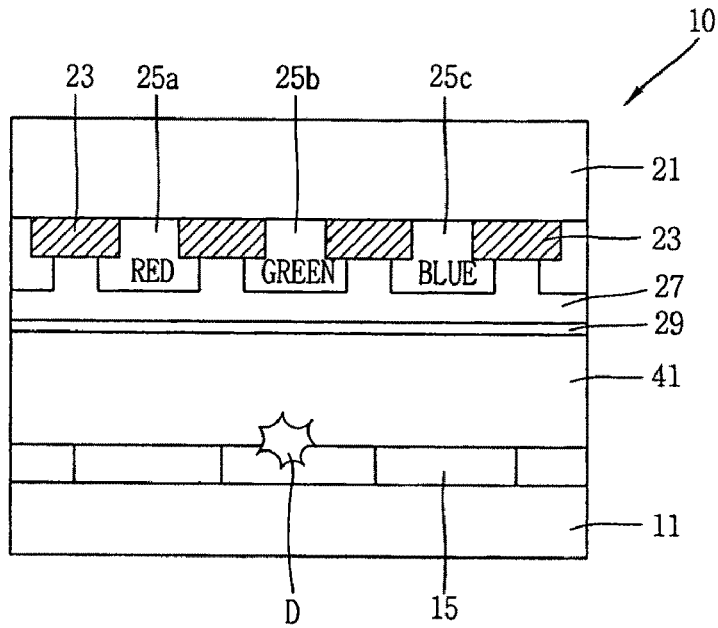
FIG. 1 is a sectional view of the LCD used for explaining the method for repairing a defective cell of the LCD according to the related art.
Figure 2:
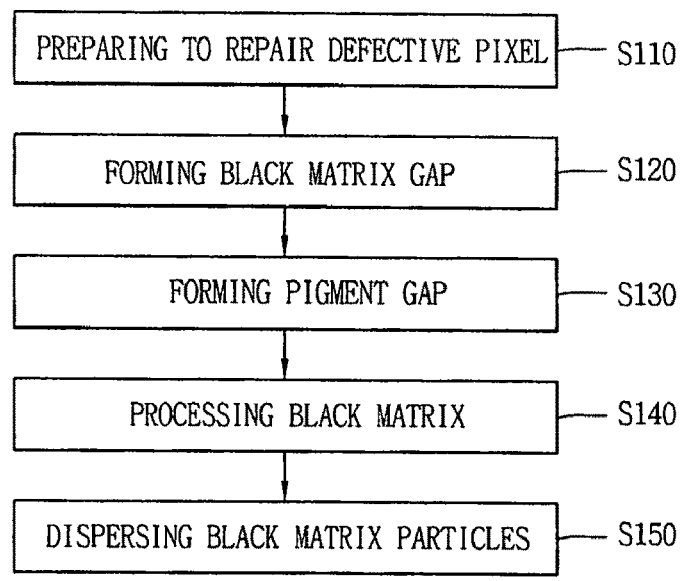
FIG. 2 is a flow chart of a repairing process of a method for repairing a defective cell of a liquid crystal panel according to one exemplary embodiment of the present invention.

As shown in FIG. 2, the method for repairing a defective cell of a liquid crystal panel according to one exemplary embodiment of the present invention includes: preparing a liquid crystal panel which has been completely fabricated and is subjected for defective cell repairing (S110); irradiating laser to black matrixes formed in a defective cell of the liquid crystal panel to float the black matrixes with a certain gap between the black matrixes and an upper substrate (S120) (a first laser irradiating step); irradiating laser to a pigment layer representing color to form a comb-like structure with a gap between its teeth between the pigment layer and the upper substrate (S130) (a second laser irradiating step); irradiating laser to the black matrixes to process the black matrixes to generate particles in the black matrixes (S140) (a third laser irradiating step); and irradiating laser to fill the black matrix particles in the comb-like structure of the pigment region and dispersing the particles so as to be evenly distributed (S150) (a fourth laser irradiating step).

The defective cell repairing process is performed under the processing conditions as shown in FIG. 5, in which laser power, a slit size, a scanning speed, a processing direction, or the like are appropriately adjusted by steps to fill the black matrix particles within the defective cell (P).

The processing conditions of FIG. 5 are repairing conditions for green color for testing, and repairing conditions for red and blue colors may differ. In addition, the processing condition may vary to shorten a processing time, and a portion of the processing step may be omitted or added according to circumstances.

Before repairing the defective cell of the liquid crystal panel, a process of fabricating the liquid crystal panel is performed.

Figure 3A:
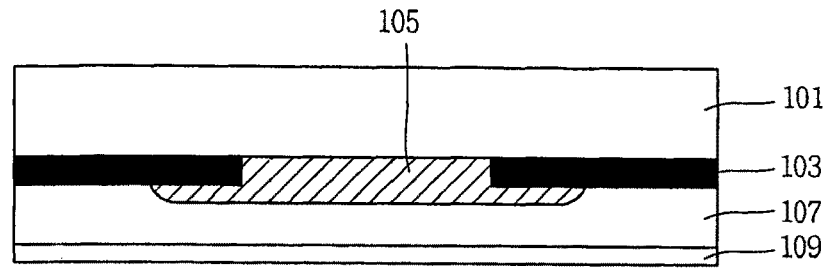
FIGS. 3a to 3e are sectional views showing the repairing process for explaining the method for repairing a defective cell of a liquid crystal panel according to one exemplary embodiment of the present invention.

As shown in FIG. 3a, the liquid crystal panel (not shown) includes an upper array substrate (or color filter array substrate) including black matrixes 103, a color filter layer 105 (referred to as 'pigment layer', hereinafter) made of a color pigment, an overcoat layer 107, a pattern spacer (not shown), a common electrode 109, and an upper alignment layer (not shown) sequentially formed on an upper substrate 101; a lower array substrate (not shown) including TFTs (not shown) formed on a lower substrate (not shown), pixel electrodes (not shown) and a lower alignment layer (not shown); and a liquid crystal layer (not shown) injected into an internal space between the upper array substrate 101 and the lower array substrate (not shown).

Although not shown, the TFT formed on the lower array substrate includes: a gate electrode (not shown) formed on the lower substrate together with a gate line, a semiconductor layer (not shown) overlapping with the gate electrode and a gate insulating layer (not shown) formed on the gate electrode; and source and drain electrodes (not shown) formed together with a data line (not shown) on the semiconductor layer.

The TFT supplies a pixel signal from the data line to the pixel electrode (not shown) in response to a scan signal from the gate line.

Although not shown, the pixel electrode made of a transparent conductive material with high light transmittance is electrically connected with the drain electrode (not shown) of the TFT with a passivation layer (not shown) interposed therebetween.

The upper and lower alignment layers (not shown) for liquid crystal alignment are formed by coating an alignment material such as polyimide and then rubbed to complete the fabrication process of the liquid crystal panel.

Figure 6:
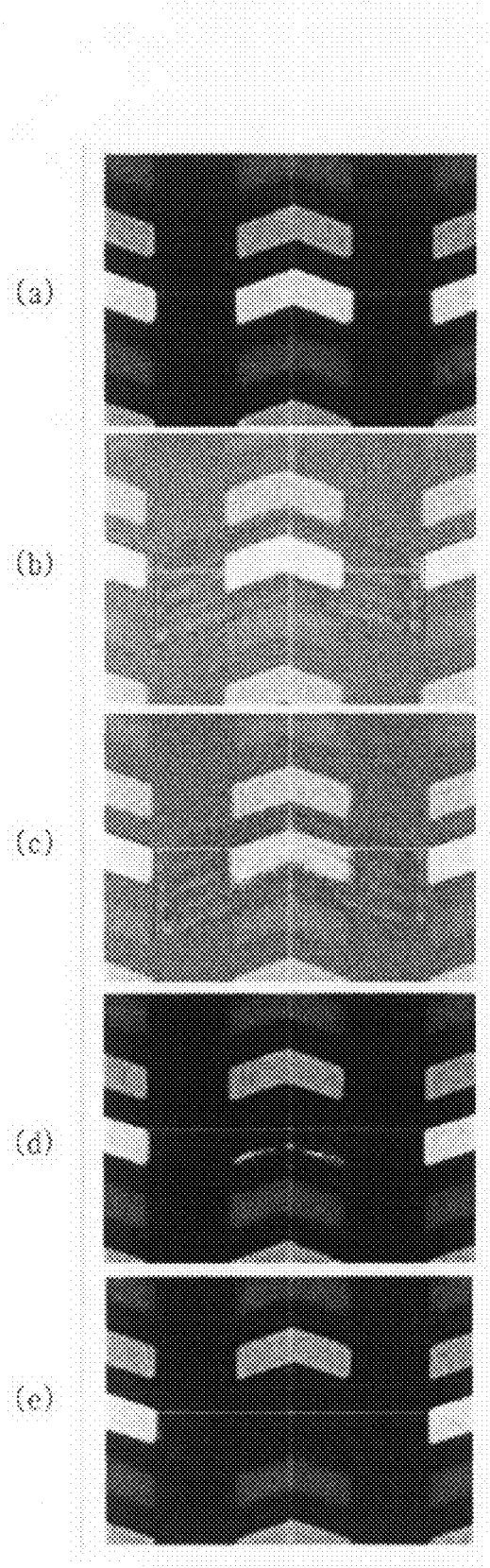
FIG. 6 shows photographs of images of defective cells obtained after the process of repairing a defective cell of a liquid crystal panel is performed according to one exemplary embodiment of the present invention.

The thusly fabricated liquid crystal panel includes a plurality of cells. In inspecting the liquid crystal panel after fabrication, of the cells, one or more cells are defective with bright spots that light in a black or gray pattern due to a foreign substance or the like as shown in FIG. 6.

Thereafter, the defective cell (P) is darkened through a repairing process performed under the repair processing conditions as shown in FIG. 5.

Figure 3B:
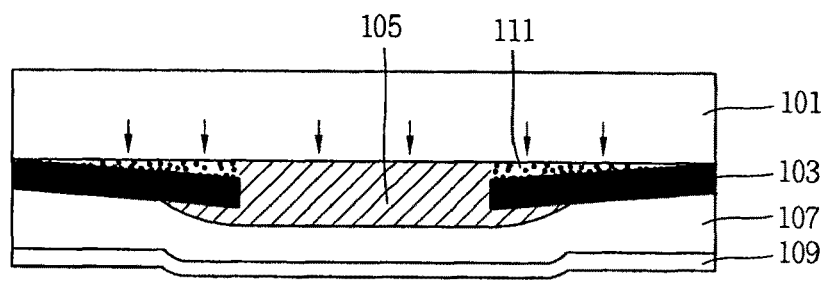

As shown in FIGS. 3b, 5 and 6b, laser is first irradiated to the black matrix 103 and the pigment layer 105 of the defective cell (P) to make the black matrix 103 float from the upper substrate 101 by a certain interval to form a gap 111 therebetween. In addition, the laser can be irradiated onto the pigment layer 105. In this case, laser power of the first laser irradiation ranges from 100 µJ to 470 µJ, a slit size is substantially 15×15 µm, and a scanning speed ranges about 30 µm/sec to 70 µm/sec. In addition, the laser power used for the first laser irradiation is lower than that of a second laser irradiation performed to make the pigment layer 105 float. This is to prevent the black matrix 103 from being decomposed and damaged due to the laser power of the second laser irradiation for making the pigment 105 float, to cause a light leakage.

Most preferably, the laser power of the first laser irradiation ranges from 100 µJ to 450 µJ and the scanning speed ranges from 45 µm/sec to 65 µm/sec. Here, the laser power used for the first laser irradiation refers to power outputted to a laser inspecting equipment, and power of about at least one-tenth or smaller of the above-mentioned power is actually applied to the substrate. The other remaining conditions, namely, the slit size, the scanning speed and other conditions may be differently applied depending on an experimentation product, a processing equipment, etc.

The first laser irradiation process is a pre-process for making the pigment layer 105 float, in which the first laser irradiation is performed on the pigment layer 105 including the black matrix 103 to thereby suppress the pressure from being increased to thus prevent the pigment layer 105 from being broken when it is floated during the second laser irradiation, the follow-up process. That is, if the laser irradiation is performed to first float the pigment layer 105, the pigment layer 105, namely, the color filter, may be broken due to an increased pressure.

Figure 4A:
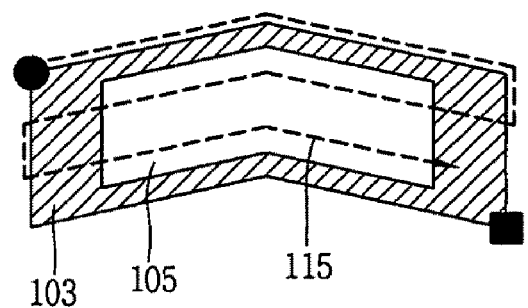
FIGS. 4a to 4i are plan views schematically showing a laser scanning process used for the process of repairing a defective cell of a liquid crystal panel according to one exemplary embodiment of the present invention.

With reference to FIG. 4a, the first laser scanning process is performed starting from a left (or right) edge of an upper portion of the black matrix 103 and horizontally proceeds through the pigment layer 105 to an edge of a lower portion of the black matrix 103. In this case, the laser scanning process may be performed starting from the left side (or right side) of the lower portion of the black matrix 103, instead of the left side (or right side) of the upper portion of the black matrix 103, and proceeds to the upper portion of the black matrix 103. Namely, the laser scanning process may be performed to start any position of the left or right side.

The wavelength of the laser used for forming the gap of the black matrix 103 is performed well at the entire wavelength band. This is because the black matrix 103 is black, so it can be well absorbed at the wavelength band of the visible ray region. In this case, the black matrix 103 may be made of polyimide with a carbon-based pigment mixed therein.

Figure 3C:
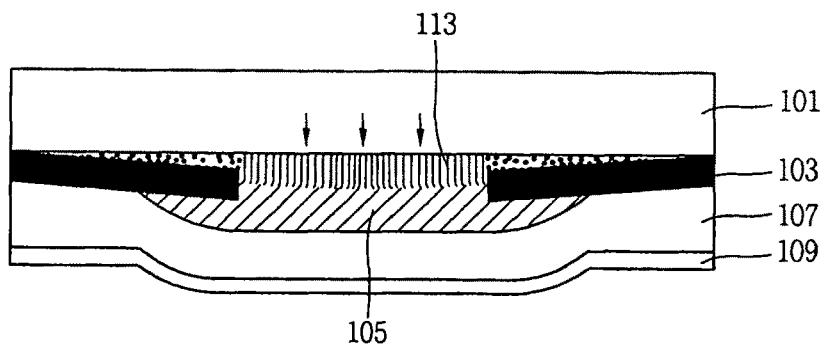

Next, as shown in FIGS. 3c, 5 and 6c, in order to make the pigment layer 105 float at a certain interval from the upper substrate 101, laser is secondly irradiated to the pigment layer 105 to form a comb-like structure 113 having a gap (i.e., a space, an opening, or hole) between its teeth. In this case, in order to prevent the pigment layer 105 from being broken during the second laser irradiation, the gap of the comb-like structure 113 formed between the upper substrate 101 and the pigment layer 105 ranges from 0.5 μm to 2 μm, and after a final processing is performed, the gap is desired to be about 2 μm. In this case, the gaps exist between the teeth of the comb-like structure 113. Here, when the second laser irradiation is performed, a gas layer is formed between the upper substrate 101 and the pigment layer 105 to make the pigment layer 105 separated from the upper substrate 101 to form the comb-like structure 113 with the gap between its teeth.

The laser power used for the second laser irradiation ranges about 200 μJ to 620 μJ, a slit size is about 20 μm×30 μm, and a scanning speed ranges about 20 μm/sec to 50 μm/sec. Most preferably, the laser power ranges from 300 μJ to 500 μJ, and the scanning speed is 25 μm/sec to 35 μm/sec. Here, the laser power used for the second laser irradiation refers to power outputted to the laser irradiating equipment, and power of about at least one-tenth or smaller of the above-mentioned power is actually applied to the substrate. The other remaining conditions, namely, the slit size, the scanning speed and other conditions may be differently applied depending on an experimentation product, a processing equipment, etc.

The laser used for the second laser irradiation has wavelength varying according to the color of pixels. Red laser has a wavelength range of about 500 nm to 550 nm, and blue and green laser has a wavelength range of about 300 nm to 400 nm. This attributes to the specific characteristics of pigments, and the laser has a high absorbance at such wavelength bands (namely, has low transmittance), so the pigment is subjected to a physical and chemical damage due to photon and thus separated from the substrate. In addition, as mentioned above, because bubbles are generated due to a gas formed between the substrate and the pigment layer during the laser irradiation, a gap is formed between the substrate and the pigment layer.

Figure 4B:
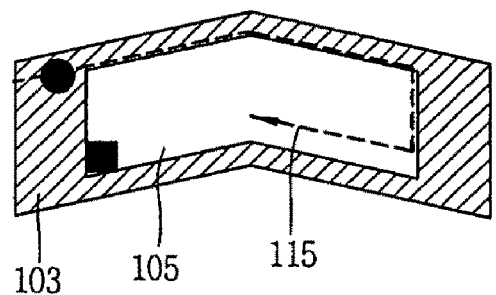

The second laser irradiation process is performed to make the pigment layer 105 float. As shown in FIG. 4b, a second laser scanning process may be performed starting from the left side of an upper portion of the pigment layer 105 and horizontally proceeds to a lower portion of the pigment layer 105. Alternatively, the second laser scanning process may be performed starting from the left side of the lower portion, rather than starting from the left side of the upper portion of the pigment layer 105, and proceeds to move to the upper portion. Namely, the laser scanning process may be performed at any position of the left or right side.

By doing that, the edge portion of the comb-like structure 113, namely, the region overlapping with the black matrix 103, is formed to be tilt at about 4° to 10°, and a central portion of the pigment layer 105 of the pixel region is formed to be convex.

As the section of the pigment layer 105 has the convex shape because of the formation of the comb-like structure 113, the cell gap is reduced, and in this case, the transmittance is also reduced, contributing to darkening. This is because, the convex portion presses liquid crystal to distort the liquid crystal arrangement, so the function of the upper alignment layer (not shown) of the pigment layer 105 is somewhat lost.

Figure 3D:
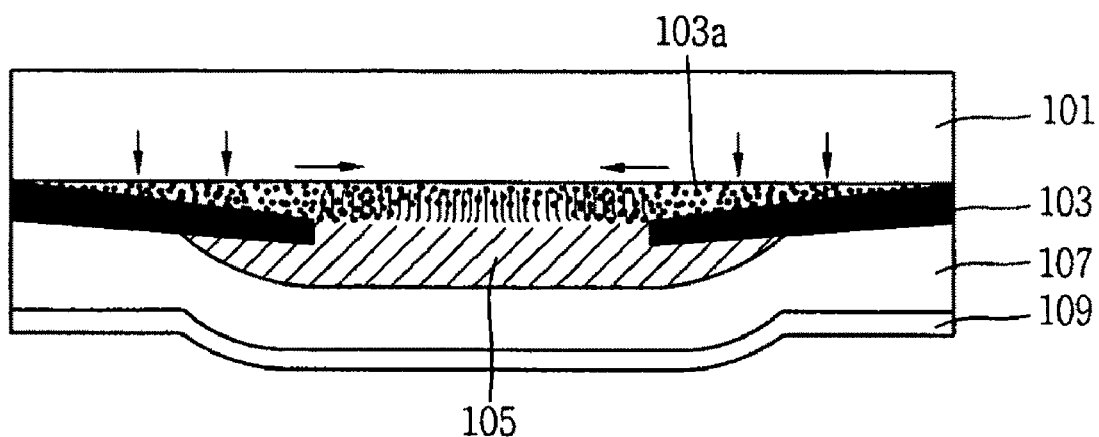

Subsequently, as shown in FIGS. 3d, 5 and 6d, in a black matrix processing step, laser is thirdly irradiated to the black matrix 103 and the pigment layer 105 to generate a plurality of black matrix particles 103a in the black matrix 103 and start to fill the black matrix particles 103a in the gaps of the teeth of the comb-like structure formed between the pigment layer 105 and the upper substrate 101.

The laser power used for the third laser irradiation ranges about 200 μJ to 600 μJ, a slit size is about 11 μm×11 μm, and a scanning speed ranges about 25 μm/sec to 45 μm/sec. Most preferably, the laser power ranges from 220 μJ to 550 μJ, and the scanning speed is 27 μm/sec to 40 μm/sec. In the black matrix processing step according to the third laser irradiation, the laser has a wavelength range of about 300 nm to 400 nm.

Here, the laser power used for the third laser irradiation refers to power outputted to the laser irradiating equipment, and power of about at least one-tenth or smaller of the above-mentioned power is actually applied to the substrate. The other remaining conditions, namely, the slit size, the scanning speed and other conditions may be differently applied depending on an experimentation product, a processing equipment, etc.

Figure 4C:
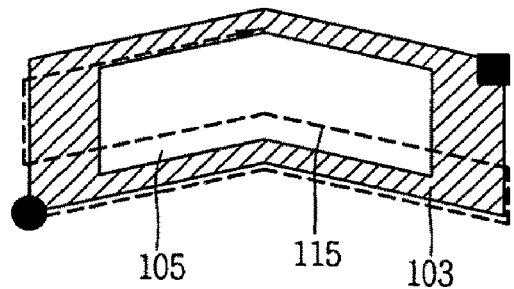
Figure 4D:
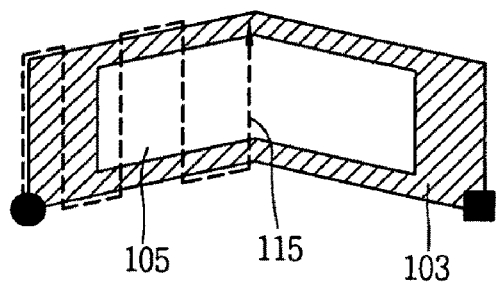
Figure 4E:
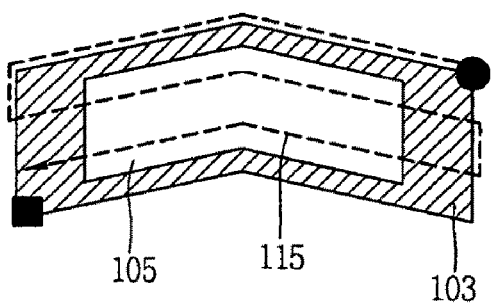

The black matrix processing step according to the third laser irradiation is performed through laser scanning one or more times. For example, the scanning process includes a first scanning process that is performed starting from the left side of a lower portion of the defective cell and horizontally proceeds to a right edge of the upper portion (See FIG. 4c); a second scanning process that is performed starting from the left side of the lower portion of the defective cell (P) and vertically proceeds to the right edge (See FIG. 4d), and a third scanning process that is performed starting from the right edge of the upper portion and horizontally proceeds to the left edge (See FIG. 4e). In this case, the third laser scanning process may be performed starting from the left side of the lower portion, rather than from the right side of the upper portion, of the black matrix 103 and the pigment layer 105 and proceed to the lower portion. Namely, the laser scanning process may be performed at any position of the left or right side.

Figure 3E:
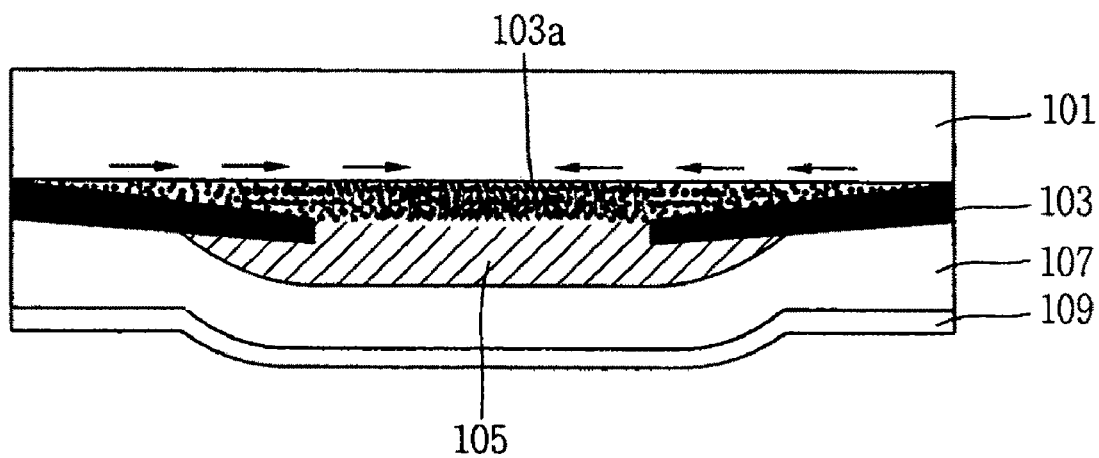

Thereafter, as shown in FIGS. 3e, 5 and 6e, in a black matrix particle dispersing step, laser is fourthly irradiated to the entire region of the black matrix 103 and the pigment layer 105 to allow the black matrix particles 103 generated in the previous step to be filled in the gaps formed between the teeth of the comb-like structure 113 of the pigment layer 105 so as to be evenly dispersed and distributed.

The laser power used for the fourth laser irradiation ranges from about 180 μJ to 420 μJ lower than that used for the black matrix processing step. The slit size is about 10 μm×10 μm, and the scanning speed ranges about 20 μm/sec to 45 μm/sec.

Preferably, the laser power ranges from 200 μJ to 380 μJ, and the scanning speed ranges about 25 μm/sec to 40 μm/sec. The movement direction of the black matrix particles 103a is determined according to the direction of the laser irradiation.

Here, the laser power used for the fourth laser irradiation refers to power outputted to a laser inspecting equipment, and power of about at least one-tenth or smaller of the above-mentioned power is actually applied to the substrate. The other remaining conditions, namely, the slit size, the scanning speed and other conditions may be differently applied depending on an experimentation product, a processing equipment, etc.

Figure 4F:
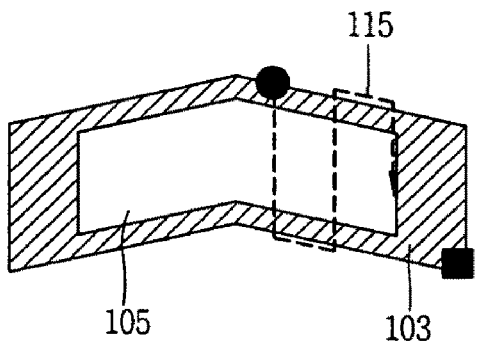
Figure 4G:
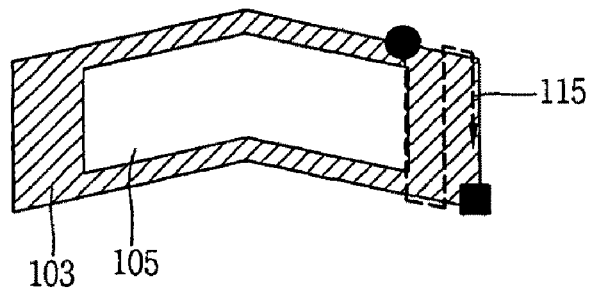
Figure 4H:
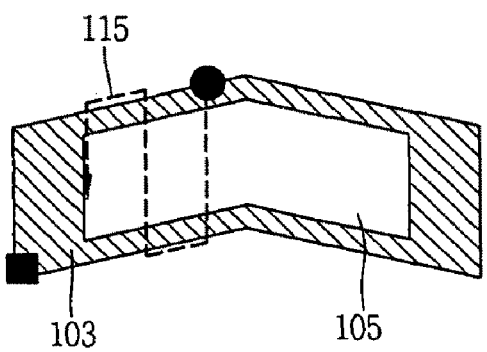
Figure 4I:
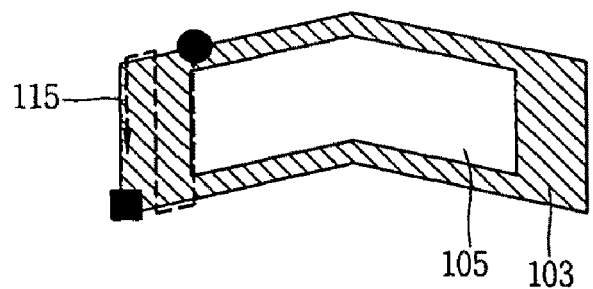

The fourth laser irradiation process is performed through laser scanning in at least several directions, namely, in horizontal and vertical directions. For example, the scanning process 115 includes a first scanning process that is performed starting from the center of the pigment layer 105 of the defective cell (P) and vertically proceeds to a right edge of the pigment layer 105 (See FIG. 4f); a second scanning process that is performed starting from the black matrix 103 adjacent to the pigment layer 105 and vertically proceeds to an edge of the black matrix 103 (See FIG. 4g), a third scanning process that is performed starting from the center of the pigment layer 105 of the defective cell (P) and proceeds to the left edge (See FIG. 4h), and a fourth scanning process that is performed starting from the black matrix 103 adjacent to the pigment layer 105 and vertically proceeds to the left edge of the black matrix 103 (See FIG. 4i).

In this case, the fourth laser scanning process may be performed at any position of the left or right side of the center of the pigment layer 105 region.

As the laser used for the laser irradiation, one of laser which is oscillated by using a neonium solid and uses YAG crystal as an amplification medium, an excimer laser (i.e., laser using the phenomenon that molecules in an excited state called excimer created by atom in an excited state and atom in a base state emit light to be returned to a dissociated state), and diode laser (i.e., laser oscillated by using light generated according to carrier movement or an energy level movement in a bonded part of an N type semiconductor and a P type semiconductor) is used.

The Nd YAG laser has a wavelength of 330 nm to 350 nm, 530 nm to 550 nm and 1060 nm to 1090 nm, the excimer laser has a wavelength of 170 nm to 200 nm, and the diode laser has a wavelength of 100 nm to 1000 nm.

Also, laser generated by using CO, $CO_2$, He—Ne and HF may be used. The Co laser has a wavelength of 4900 nm to 5100 nm, $CO_2$ laser has a wavelength of 630 nm to 640 nm, and He—Ne laser has a wavelength of 2700 nm to 2900 nm.

In this manner, the process for repairing the defective cell of the liquid crystal panel according to one exemplary embodiment of the present invention includes: forming the gap of the black matrix from the upper substrate (S120); forming the comb-like structure with the certain gap between its teeth of the pigment layer from the upper substrate (S130), processing the black matrix to generate black matrix particles (S140); and dispersing the black matrix particles such that the particles are filled in the comb-like structure of the pigment layer in an evenly distributed manner (S150).

Figure 7:
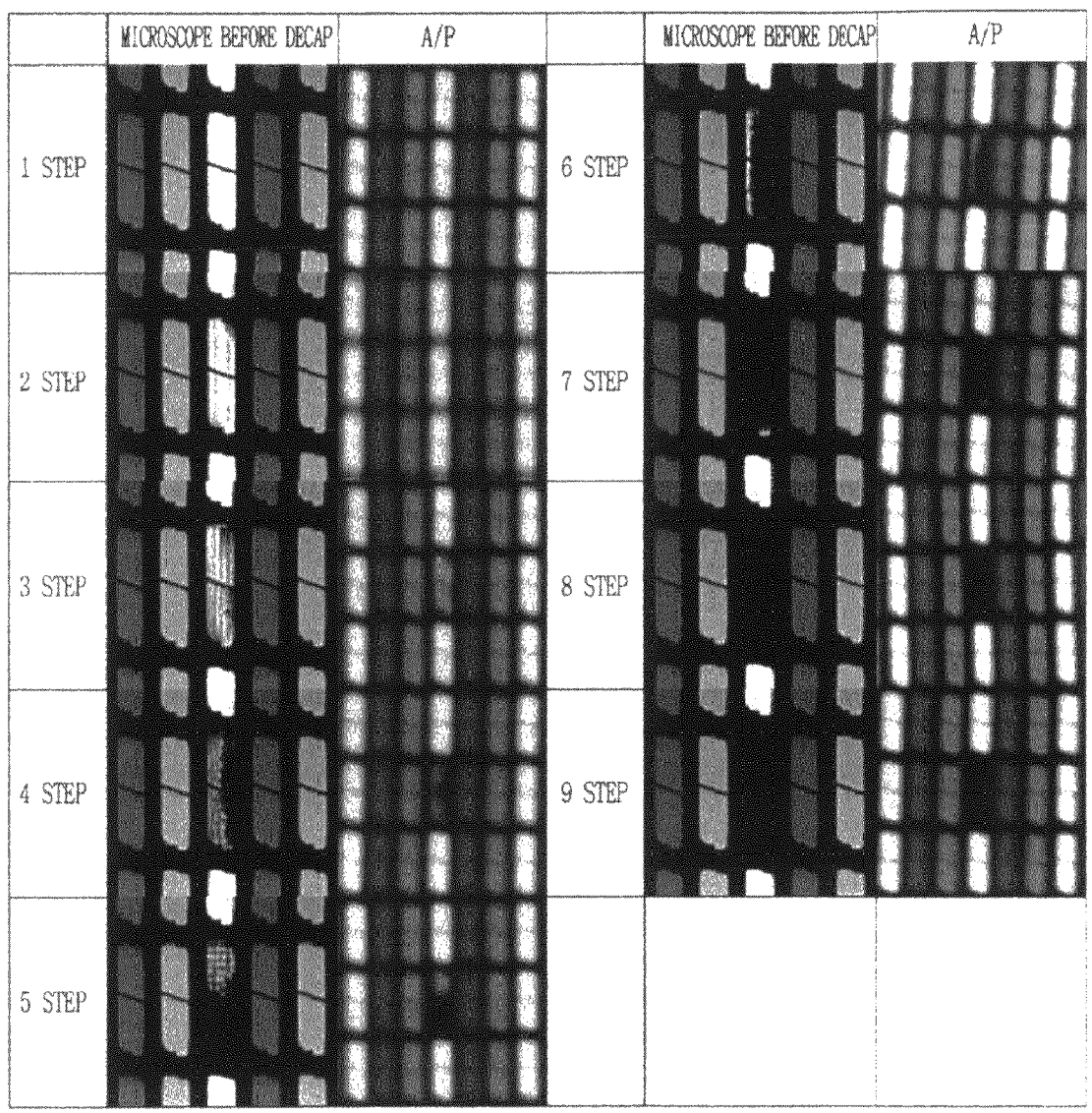
FIG. 7 shows photographs showing a comparison between microscope photograph of each process of repairing a defective cell of a liquid crystal panel and an actual A/P (Auto Probe) phenomenon according to one exemplary embodiment of the present invention.

The results obtained by the defective cell repairing process according to an exemplary embodiment of the present invention reveal as shown in FIG. 7 that a transmitted image of a microscope is observed to be the same as an image appearing in a white pattern of an actual A/P (Auto Probe).

In addition, it can be noted that darkening is made while the repairing process is performed by dispersing the black matrix particles.

Figure 8A:
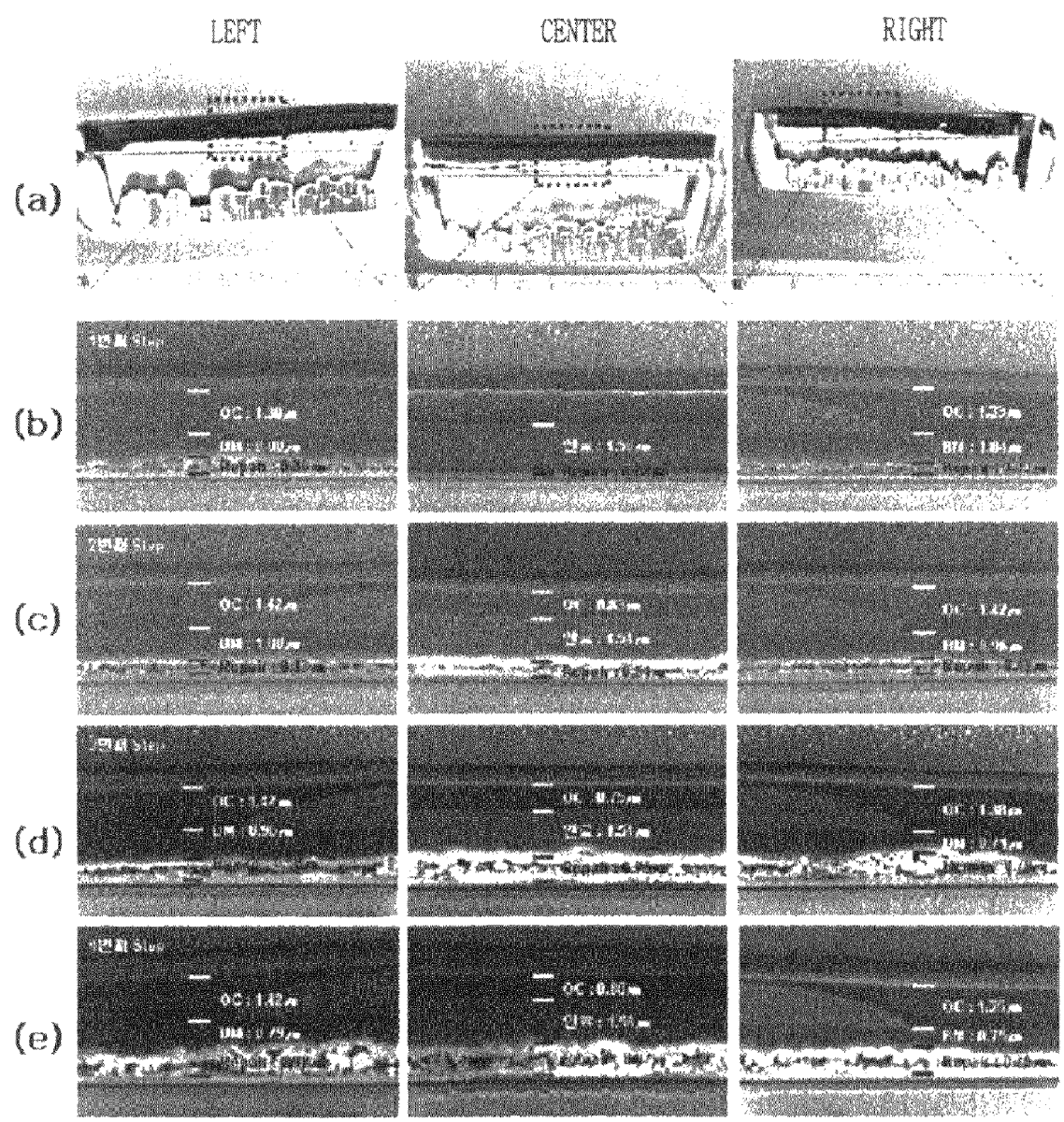
FIGS. 8a and 8b show photographs showing sectional structures of states of defective cells obtained after performing the process of repairing a defective cell of a liquid crystal panel according to one exemplary embodiment of the present invention.
Figure 8B:
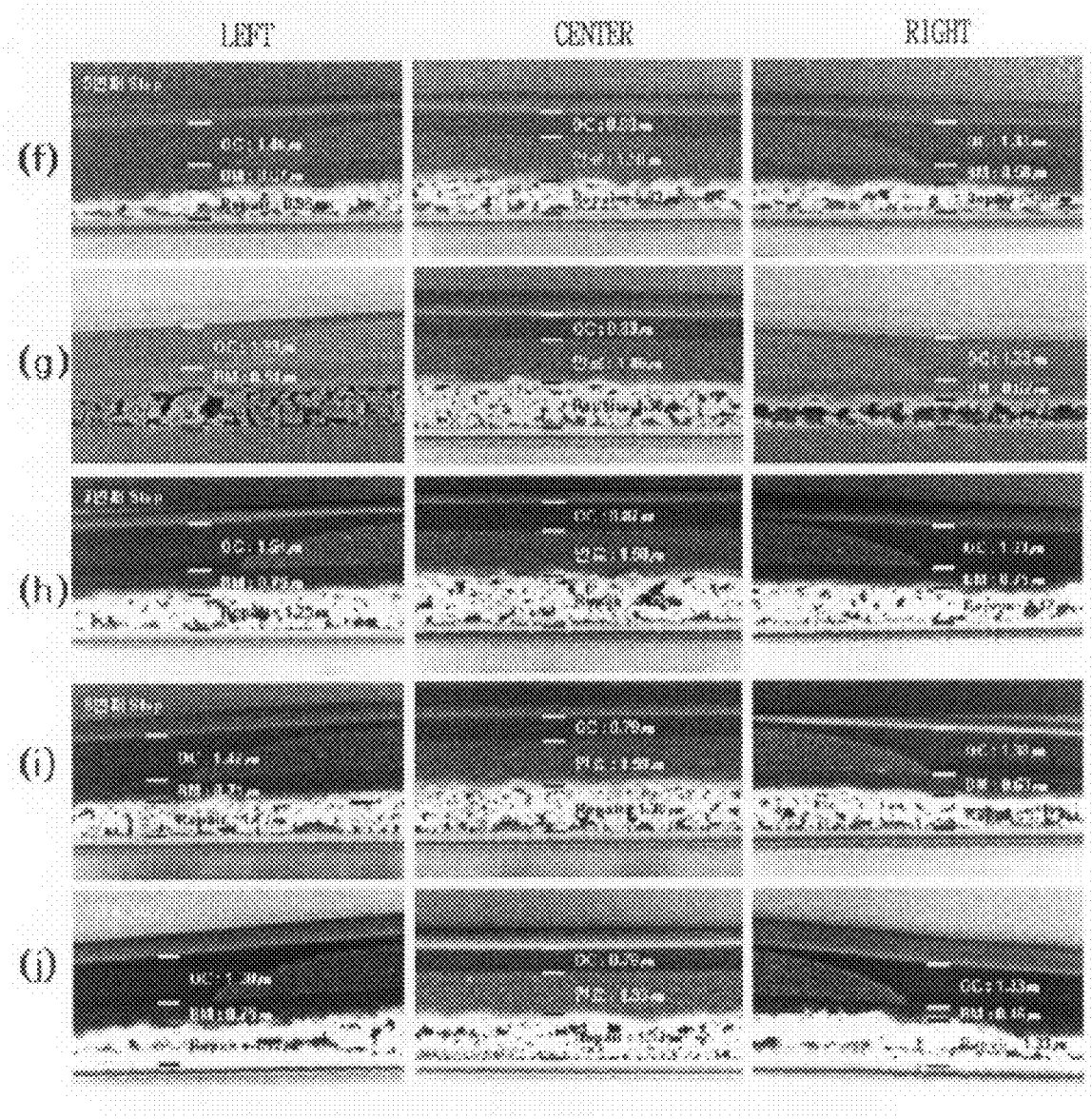

With reference to FIGS. 8a and 8b, by performing the repairing process up to the black matrix particle dispersing step, the thickness of the black matrix filled at a portion where light is leaked in the defective cell (P) is thinner than the darkened portion.

In addition, it is noted that, when the section of the portion where light was leaked was viewed by a microscope or an A/P through FIB (Focused Ion Beam) analysis, it was thinner than the portion of dark pixels at the opposite side of the defective cell.

The thickness of the black matrix at the portion where light is leaked is about 0.38 µm, and the thickness of the portion of dark pixels is about 1.33 µm, making a difference of about 0.5 µm.

In addition, the thickness of the black matrix within the defective cell (P) does not have a certain fixed size but is increased as the processing steps are sequentially performed.

The thickness of the black matrix remaining at both sides of the defective cell after the repairing process is about 0.5 µm to 0.7 µm, and the black matrix is considerably (much) processed at the black matrix processing step.

A method for repairing a defective cell of a liquid crystal panel according to another exemplary embodiment of the present invention will now be described with reference to the accompanying drawings.

Figure 9:
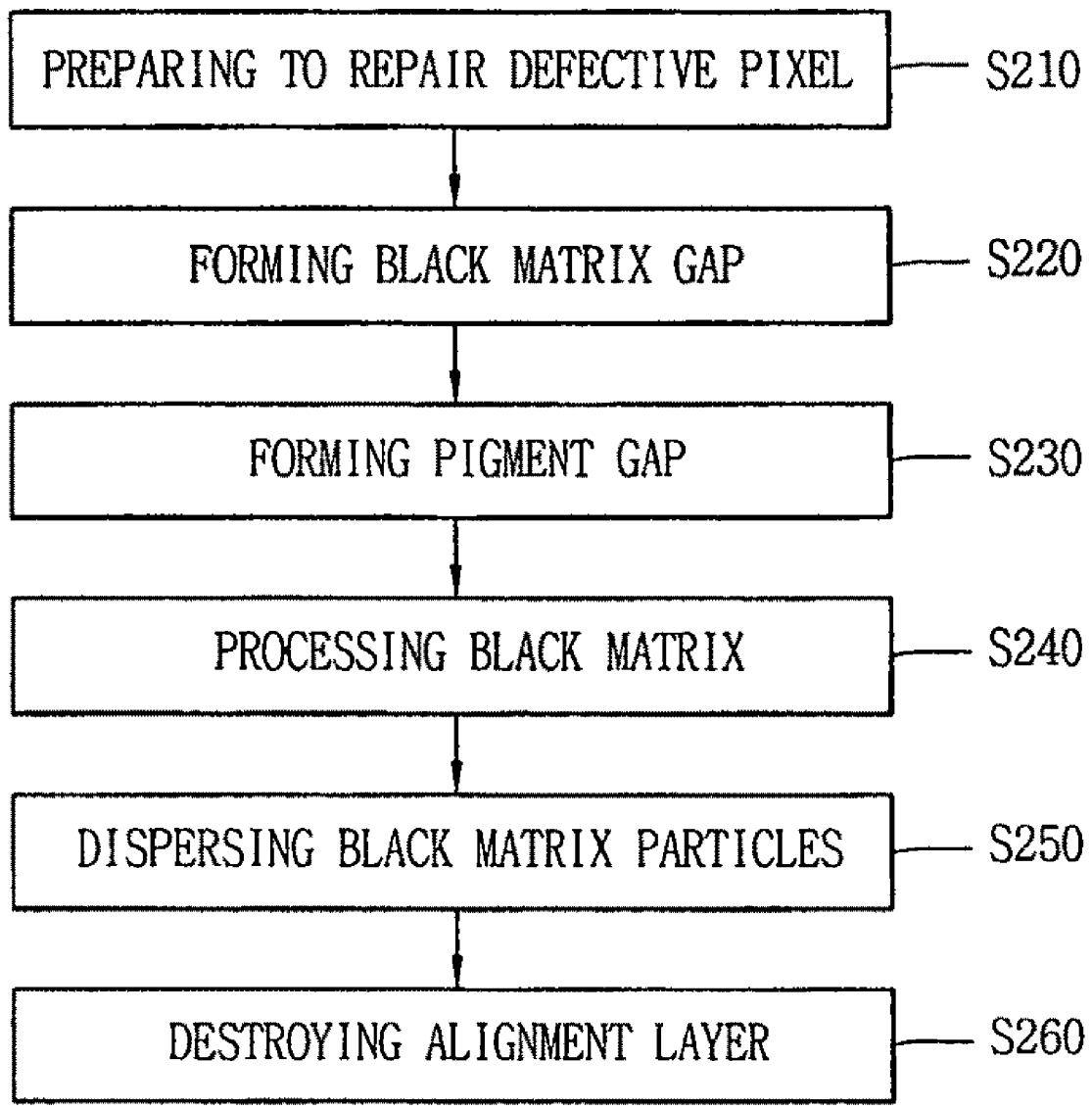
FIG. 9 is a flow chart of a repairing process of a method for repairing a defective cell of a liquid crystal panel according to another exemplary embodiment of the present invention.

FIG. 9 is a flow chart of a repairing process of a method for repairing a defective cell of a liquid crystal panel according to another exemplary embodiment of the present invention.

FIGS. 10a to 10f are sectional views showing the repairing process for explaining the method for repairing a defective cell of a liquid crystal panel according to another exemplary embodiment of the present invention.

Figure 11:
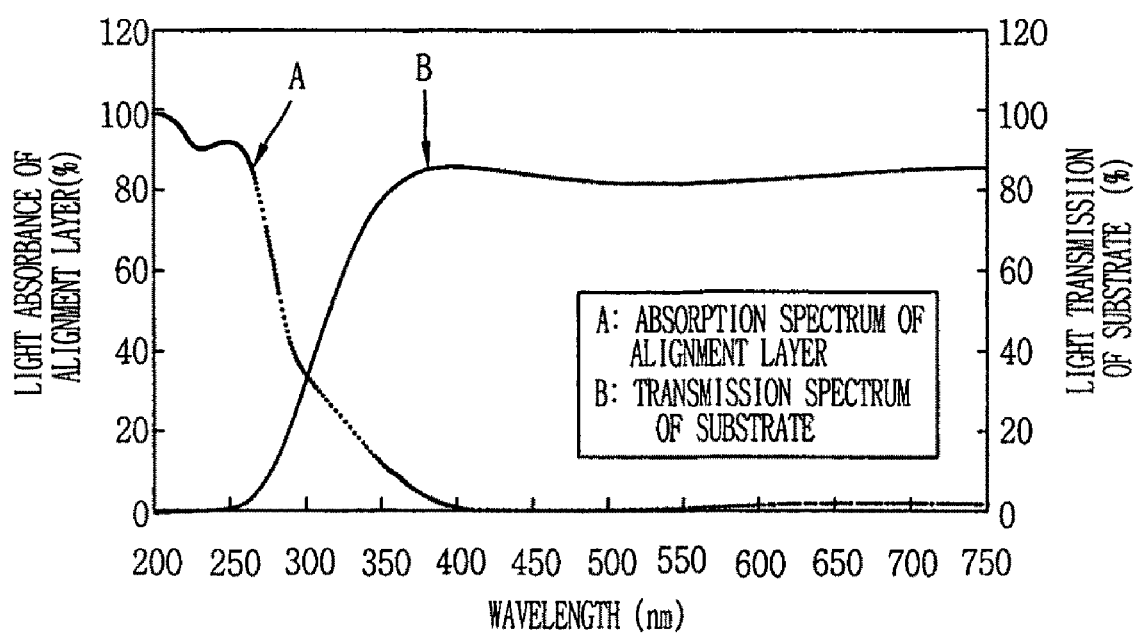
FIG. 11 is a graph showing light absorbance of an alignment layer and light transmittance of a substrate according to wavelength range of an ultraviolet ray source in the method for repairing a defective cell of a liquid crystal panel according to another exemplary embodiment of the present invention.

FIG. 11 is a graph showing light absorbance of an alignment layer and light transmittance of a substrate according to wavelength range of an ultraviolet ray source in the method for repairing a defective cell of a liquid crystal panel according to another exemplary embodiment of the present invention.

As shown in FIG. 9, the method for repairing a defective cell of a liquid crystal panel according to another exemplary embodiment of the present invention includes: preparing a liquid crystal panel which has been completely fabricated and is subjected for defective cell repairing (S210); irradiating laser to black matrixes formed in a defective cell of the liquid crystal panel to float the black matrixes with a certain gap between the black matrixes and an upper substrate (S220) (a first laser irradiating step); irradiating laser to a pigment layer representing color to form a comb-like structure between the pigment layer and the upper substrate (S230) (a second laser irradiating step); irradiating laser to the black matrixes to process the black matrixes to generate particles in the black matrixes (S240) (a third laser irradiating step); irradiating laser to disperse the black matrix particles so as to be evenly distributed in the gaps between teeth of the comb-like structure of the pigment layer (S250) (a fourth laser irradiating step); and destroying an alignment layer disposed in a black cell (S260).

Before repairing the defective cell of the liquid crystal panel, a process of fabricating the liquid crystal panel is performed.

Figure 10A:
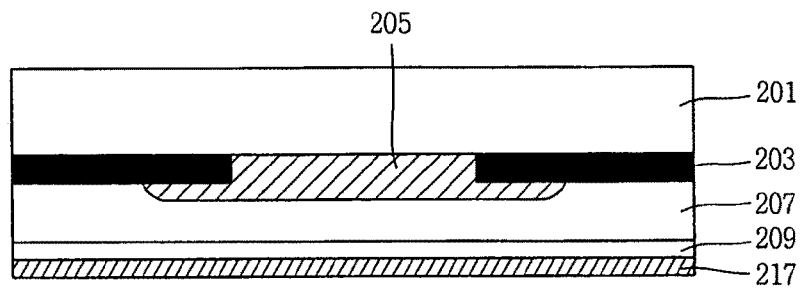
FIGS. 10a to 10f are sectional views showing the repairing process for explaining the method for repairing a defective cell of a liquid crystal panel according to another exemplary embodiment of the present invention.

As shown in FIG. 10a, the liquid crystal panel (not shown) includes an upper array substrate (or color filter array substrate) including black matrixes 203, a pigment layer 205 (referred to as 'color filter', hereinafter) made of a color pigment, an overcoat layer 207, a pattern spacer (not shown), a common electrode 209, and an upper alignment layer (not shown) sequentially formed on an upper substrate 201; a lower array substrate (not shown) including TFTs (not shown: Refer to 251 in FIG. 10f) formed on a lower substrate (not shown: Refer to 257 in FIG. 10f), pixel electrodes (not shown) and a lower alignment layer (not shown); and a liquid crystal layer (not shown: Refer to 261 in FIG. 10f) formed between the upper array substrate 201 and the lower array substrate (not shown).

The TFT formed on the lower array substrate includes: a gate electrode (not shown) formed on the lower substrate (not shown: Refer to 251 in FIG. 10f) together with a gate line, a semiconductor layer (not shown) overlapping with the gate electrode and a gate insulating layer (not shown) formed on the gate electrode; and source and drain electrodes (not shown) formed together with a data line (not shown) on the semiconductor layer. The TFT supplies a pixel signal from the data line to the pixel electrode (not shown) in response to a scan signal from the gate line.

Although not shown, the pixel electrode made of a transparent conductive material with high light transmittance is electrically connected with the drain electrode (not shown) of the TFT with a passivation layer (not shown: Refer to 253 in FIG. 10f) interposed therebetween.

The upper and lower alignment layers 217 and 257 for liquid crystal alignment are formed by coating an alignment material such as polyimide and then rubbed to complete the fabrication process of the liquid crystal panel.

The thusly fabricated liquid crystal panel includes a plurality of cells. In inspecting the liquid crystal panel after fabrication, of the cells, one or more cells are defective with bright spots that light in a black or gray pattern due to a foreign substance or the like as shown in FIG. 6.

Figure 10B:
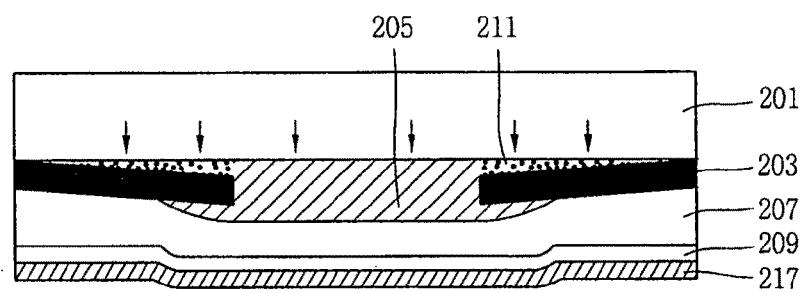

Thereafter, the defective cell (P) is darkened through a repairing process. In order to perform repairing process, as shown in FIGS. 10b and 6b, laser is first irradiated to the black matrix 203 of the defective cell (P) to make the black matrix 203 float from the upper substrate 201 by a certain interval to form a gap 211 therebetween. In this case, laser power of the first laser irradiation ranges from 100 µJ to 470 µJ, a slit size is substantially 15×15 µm, and a scanning speed ranges about 30 µm/sec to 70 µm/sec. Most preferably, the laser power of the first laser irradiation ranges from 100 µJ to 450 µJ and the scanning speed ranges from 45 µm/sec to 65 µm/sec. Here, the laser power used for the first laser irradiation refers to power outputted to a laser inspecting equipment, and power of about at least one-tenth or smaller of the above-mentioned power is actually applied to the substrate. The other remaining conditions, namely, the slit size, the scanning speed and other conditions may be differently applied depending on an experimentation product, a processing equipment, etc.

In this case, the laser power used for the first laser irradiation is lower than that of a second laser irradiation performed to make the pigment layer 205 float. This is to prevent the black matrix 203 from being decomposed and damaged due to the laser power of the second laser irradiation for making the pigment 205 float, to cause a light leakage.

The first laser irradiation process is a pre-process for making the pigment layer 205 float, in which the first laser irradiation is performed on the black matrix 203 to thereby suppress the pressure from being increased to thus prevent the pigment layer 105 from being broken when it is floated during the second laser irradiation, the follow-up process. That is, if the laser irradiation is performed to first float the pigment layer 205, the pigment layer 205 may be broken due to an increased pressure.

Although not shown, the first laser scanning process is performed in the same manner as that of the former exemplary embodiment of the present invention. That is, with reference to FIG. 4a, the first laser scanning process is performed starting from a left (or right) edge of an upper portion of the black matrix 203 and horizontally proceeds to an edge of a lower portion of the black matrix 203. In this case, the laser scanning process may be performed starting from the left side (or right side) of the lower portion of the black matrix 203, instead of the left right (or right side) of the upper portion of the black matrix 203, and proceeds to the upper portion of the black matrix 203. Namely, the laser scanning process may be performed to start any position of the left or right side.

The wavelength of the laser used for forming the gap of the black matrix 203 is performed well at the entire wavelength band. This is because the black matrix 203 is black, so it can be well absorbed at the wavelength band of the visible ray region. In this case, the black matrix 203 may be made of polyimide with a carbon-based pigment mixed therein.

Figure 10C:
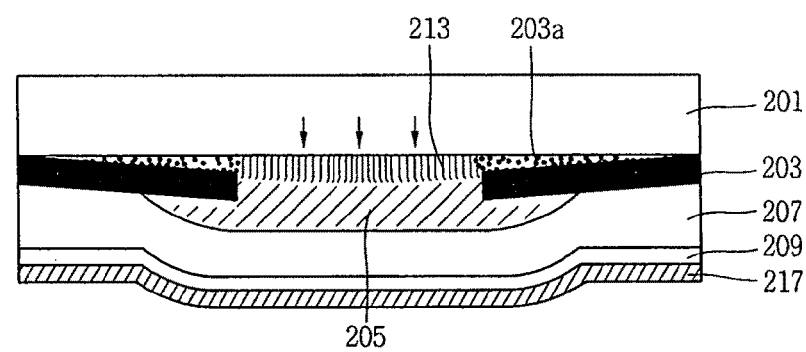

Next, as shown in FIG. 10c, in order to make the pigment layer 205 float at a certain interval from the upper substrate 201, laser is secondly irradiated to the pigment layer 205 to form a comb-like structure 213 with a gap between its teeth. In this case, especially, in order to prevent the pigment layer 205 from being broken during the second laser irradiation, the gap between the teeth of the comb-like structure 213 formed between the upper substrate 201 and the pigment layer 205 suitably ranges from 0.5 µm to 2 µm, and after a final processing is performed, the gap is desired to be about 2 µm. In this case, the gaps exist between the teeth of the comb-like structure 213.

The laser power used for the second laser irradiation ranges about 200 µJ to 620 µJ, a slit size is about 20 µm×30 µm, and a scanning speed ranges about 20 µm/sec to 50 µm/sec. Most preferably, the laser power ranges from 300 µJ to 500 µJ, and the scanning speed is 25 µm/sec to 35 µm/sec. Here, the laser power used for the second laser irradiation refers to power outputted to the laser irradiating equipment, and power of about at least one-tenth or smaller of the above-mentioned power is actually applied to the substrate. The other remaining conditions, namely, the slit size, the scanning speed and other conditions may be differently applied depending on an experimentation product, a processing equipment, etc.

The laser used for the second laser irradiation has wavelength varying according to the color of pixels. Red laser has a wavelength range of about 500 nm to 550 nm, and blue and green laser has a wavelength range of about 300 nm to 400 nm. This attributes to the specific characteristics of pigments, and the laser has a high absorbance at such wavelength bands (namely, has low transmittance), so the pigment is subjected to a physical and chemical damage due to photon and thus separated from the substrate. In addition, as mentioned above, because bubbles are generated due to a gas formed between the substrate and the pigment layer during the laser irradiation, a gap is formed between the substrate and the pigment layer 205.

The second laser irradiation process is performed to make the pigment layer 205 float. Although not shown (See FIG. 4b), a second laser scanning process may be performed starting from the left side of an upper portion of the pigment layer 205 and horizontally proceeds to a lower portion of the pigment layer 205. Alternatively, the second laser scanning process may be performed starting from the left side of the lower portion, rather than starting from the left side of the upper portion of the pigment layer 205, and proceeds to move to the upper portion. Namely, the laser scanning process may be performed at any position of the left or right side.

By doing that, the edge portion of the comb-like structure 213, namely, the region overlapping with the black matrix 203, is formed to be tilt at about 4° to 10°, and a central portion of the pigment layer 205 of the pixel region is formed to be convex.

In addition, in case of a TN mode, as the section of the pigment layer 205 has the convex shape because of the formation of the comb-like structure 213, the cell gap is reduced, and in this case, the transmittance is also reduced, contributing to darkening. This is because, the convex portion presses liquid crystal to distort the liquid crystal arrangement, so the function of the upper alignment layer 217 of the pigment layer 205 is somewhat lost.

Figure 10D:
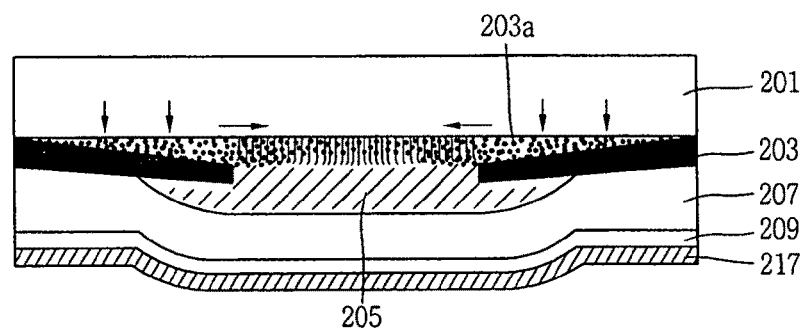

Subsequently, as shown in FIG. 10d, in a black matrix processing step, laser is thirdly irradiated to the black matrix 203 and the pigment layer 205 to generate a plurality of black matrix particles 203a in the black matrix 203 and start to fill the black matrix particles 203a in the gaps between the teeth of the comb-like structure formed between the pigment layer 205 and the upper substrate 201.

The laser power used for the third laser irradiation ranges about 200 µJ to 600 µJ, a slit size is about 11 µm×11 µm, and a scanning speed ranges about 25 µm/sec to 45 µm/sec. Most preferably, the laser power ranges from 220 µJ to 550 µJ, and the scanning speed is 27 µm/sec to 40 µm/sec. Here, the laser power used for the third laser irradiation refers to power outputted to the laser irradiating equipment, and power of about at least one-tenth or smaller of the above-mentioned power is actually applied to the substrate. The other remaining conditions, namely, the slit size, the scanning speed and other conditions may be differently applied depending on an experimentation product, a processing equipment, etc.

In the black matrix processing step according to the third laser irradiation, the laser has a wavelength range of about 300 nm to 400 nm.

The black matrix processing step according to the third laser irradiation is performed through laser scanning at least three times. The scanning process includes a first scanning process that is performed starting from the left side of a lower portion of the defective cell and horizontally proceeds to an edge of the upper portion (See FIG. 4c); a second scanning process that is performed starting from the left side of the lower portion of the defective cell (P) and vertically proceeds to the right edge (See FIG. 4d), and a third scanning process that is performed starting from the right edge of the upper portion and horizontally proceeds to the left edge of the lower portion (See FIG. 4e).

In this case, the third laser scanning process may be performed starting from the left side of the lower portion, rather than from the right side of the upper portion, of the black matrix 203 and the pigment layer 205 and proceed to the lower portion. Namely, the laser scanning process may be performed at any position of the left or right side.

Figure 10E:
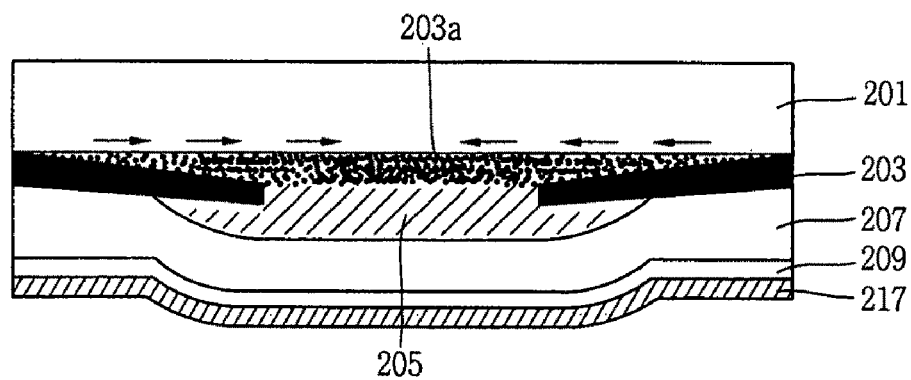

Thereafter, as shown in FIG. 10e, in a black matrix particle dispersing step, laser is fourthly irradiated to the entire region of the black matrix 203 and the pigment layer 205 to allow the black matrix particles 203a generated in the previous step to be filled in the gaps formed between the teeth of the comb-like structure 213 of the pigment layer 205 so as to be evenly dispersed and distributed.

The laser power used for the fourth laser irradiation ranges from about 180 µJ to 420 µJ lower than that used for the black matrix processing step. The slit size is about 10 µm×10 µm, and the scanning speed ranges about 20 µm/sec to 45 µm/sec.

Preferably, the laser power ranges from 200 µJ to 380 µJ, and the scanning speed ranges about 25 µm/sec to 40 µm/sec. The movement direction of the black matrix particles 203a is determined according to the direction of the laser irradiation.

Here, the laser power used for the fourth laser irradiation refers to power outputted to a laser inspecting equipment, and power of about at least one-tenth or smaller of the above-mentioned power is actually applied to the substrate. The other remaining conditions, namely, the slit size, the scanning speed and other conditions may be differently applied depending on an experimentation product, a processing equipment, etc.

The fourth laser irradiation process is performed through laser scanning in at least several directions. The scanning process includes a first scanning process that is performed starting from the center of the pigment layer 205 of the defective cell (P) and vertically proceeds to a right edge of the pigment layer 205 (See FIG. 4f); a second scanning process that is performed starting from a boundary of the black matrix 203 adjacent to the right portion of the pigment layer 205 and vertically proceeds to the right edge of the black matrix 203 (See FIG. 4g), a third scanning process that is performed starting from the center of the pigment layer 205 of the defective cell (P) and proceeds to the left edge (See FIG. 4h), and a fourth scanning process that is performed starting from the black matrix 203 adjacent to the left portion of the pigment layer 205 of the defective cell (P) and vertically proceeds to the left edge of the black matrix 203 (See FIG. 4i).

In this case, the fourth laser scanning process may be performed at any position of the left or right side of the center of the pigment layer 105 region.

As the laser used for the laser irradiation, one of laser which is oscillated by using a neonium solid and uses YAG crystal as an amplification medium, an excimer laser (i.e., laser using the phenomenon that molecules in an excited state called excimer created by atom in an excited state and atom in a base state emit light to be returned to a dissociated state), and diode laser (i.e., laser oscillated by using light generated according to carrier movement or an energy level movement in a bonded part of an N type semiconductor and a P type semiconductor) is used.

The Nd YAG laser has a wavelength of 330 nm to 350 nm, 530 nm to 550 nm and 1060 nm to 1090 nm, the excimer laser has a wavelength of 170 nm to 200 nm, and the diode laser has a wavelength of 100 nm to 1000 nm.

Also, laser generated by using CO, $CO_2$, He—Ne and HF may be used. The Co laser has a wavelength of 4900 nm to 5100 nm, $CO_2$ laser has a wavelength of 630 nm to 640 nm, and He—Ne laser has a wavelength of 2700 nm to 2900 nm.

In this case, however, when the pixels with the bright spots are darkened by using the black matrix 203, the black matrix particles 203a should be evenly dispersed with high density in the gap between the teeth of the comb-like structure 213. If the black matrix particles 203 are unevenly dispersed, a phenomenon that light is leaked between the black matrix particles 203a in a black or gray pattern in inspecting the panel might occur.

Figure 10F:
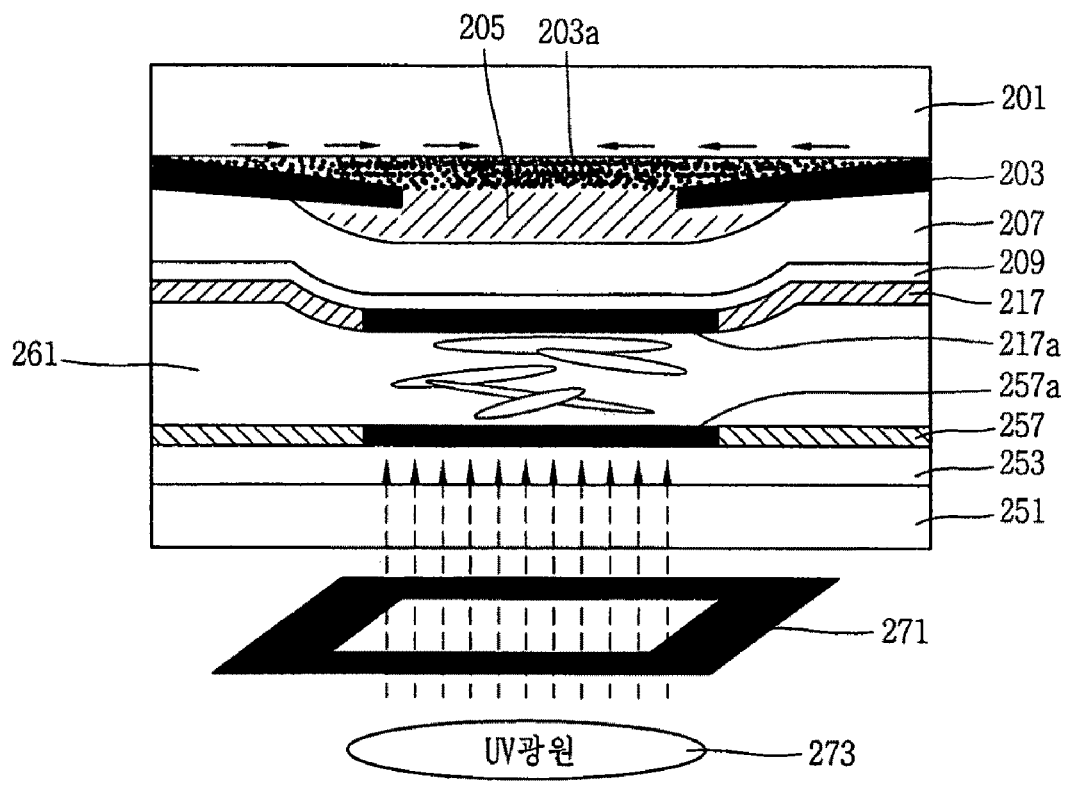

Thus, finally, in order to prevent the occurrence of such phenomenon that light is leaked between the black matrix particles 203a, as shown in FIG. 10f, UV light source 273 is irradiated to the defective cell (P) to destroy the lower and upper alignment layers 257 and 217 of the defective cell (P) to thus remove directionality of the liquid crystal 261 positioned in the defective cell. In this case, a different light source may be also used as necessary, instead of the UV light source 273.

In order to destroy the alignment layers 257 and 217, as shown in FIG. 11, a light source having a wavelength range of about 300 nm to 400 nm with a low alignment layer absorbance and high light transmittance may be used as the UV light source 273.

In case of a TFT-LCD TN mode, because the alignment layers 257 and 217 of the TFT surface and the color filter 205 surface cross each other, the liquid crystal 261 before the alignment layers 257 and 217 are destroyed is aligned to be twisted at 90° between a TFT surface and the color filter 205 surface in a state that power is turned off.

Although not shown, the alignment layer 257 may be destroyed by irradiating the UV light source 273, and as a result, the liquid crystal 261 loses its directionality and cannot be aligned vertically even when the voltage is turned on. Thus, light coming from a lower polarizer (not shown) fails to pass through the repaired pixels but diffused.

In this manner, the process for repairing the defective cell of the liquid crystal panel according to another exemplary embodiment of the present invention includes: forming the gap of the black matrix from the upper substrate (S220); forming the gap between the teeth of the comb-like structure of the pigment layer from the upper substrate (S230), processing the black matrix particles (S240); dispersing the black matrix particles into the comb-like structure of the pigment layer (S250); and destroying the alignment layers (S260).

Accordingly, by performing the repairing process, namely, the process of forming the gap of the black matrix, the process of forming the comb-like structure of the pigment layer, the process of processing the black matrix particles, the process of dispersing the black matrix particles into the comb-like structure of the pigment layer, and the process of destroying the upper and lower alignment layers, light is diffused as the directionality of liquid crystal is lost, the intensity of light directing toward the defective pixels with bright spots is weakened, and accordingly, light outputted through a polarizer (not shown) cannot be leaked through the repaired pixels, completely accomplishing darkening.

As described above, because the laser irradiation process and the alignment layer destroy process using UV light are performed on the black matrix and the pigment layer, the darkening effect for the defective cells can be maximized.

The results obtained by additionally performing the alignment layer destroy process using UV light are not shown in drawings, but it can be noted that the results would be similar to those as shown in FIGS. 7 and 8.

Meanwhile, the method for opaquely darkening the bright spots at the defective pixel region can be easily applicable to an ECB (Electrical Controlled Birefringence) or VA (Vertical Alignment) mode liquid crystal panel as well as the IPS mode liquid crystal panel and the TN mode liquid crystal panel.

Meanwhile in a different exemplary embodiment, laser may be irradiated in a state that polarizers are attached to upper and lower portions of the liquid crystal panel to darken the defective pixel region to thus repair defective cells. IN this case, because the polarizers attached to the upper and lower portions of the liquid crystal panel have a certain directionality, laser irradiation can be made along the directionality to irradiate laser to the defective cell region. Thus, the defective cell repairing process can be possibly performed with the polarizers attached.

The laser used for all laser irradiation steps has wavelength varying according to the color of pixels. Red laser has a wavelength range of about 500 nm to 550 nm, and blue and green laser has a wavelength range of about 300 nm to 400 nm. This attributes to the specific characteristics of pigments, and the laser has a high absorbance at such wavelength bands (namely, has low transmittance), so the pigment is subjected to a physical and chemical damage due to photon and thus separated from the substrate.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A method for repairing a defective cell of a liquid crystal panel, comprising:

providing a liquid crystal panel including an upper array substrate with a black matrix and a pigment layer formed thereon, a lower array substrate with a thin film transistor and attached with the upper array substrate, and a liquid crystal layer formed between the upper and lower substrates and including a plurality of cells;

performing a first laser irradiation for irradiating laser to a defective cell region among the plurality of cells in the liquid crystal panel to form a certain gap between the black matrix and the upper array substrate;

performing a second laser irradiation for irradiating laser to the defective cell region to form a comb-like structure with a certain gap between its teeth between the pigment layer and the upper array substrate;

performing a third laser irradiation for irradiating laser to the defective cell region to process the black matrix to generate black matrix particles; and performing a fourth laser irradiation for irradiating laser to the defective cell region to disperse the black matrix particles so as to be filled in the gaps between the teeth of the comb-like structure between the pigment layer and the upper array substrate.

2. The method of claim 1, wherein the laser uses at least one from among Nd YAG, excimer, CO, $CO_2$, He—Ne, HF, and a diode.

3. The method of claim 1, wherein if laser irradiated to the defective cell region is red, it has a wavelength range of 500 nm to 550 nm, if the laser is blue and green, it has a wavelength range of 300 nm to 400 nm.

4. The method of claim 1, wherein the gap between the upper array substrate and the pigment layer is 0.5 μm to 2 μm.

5. The method of claim 1, wherein laser power applied to the defective cell region is less than one-tenth of the range of 100 μJ to 700 μJ.

6. The method of claim 5, wherein, laser power of less than one-tenth of the range of 100 μJ to 470 μJ is applied to the defective cell region in forming the black matrix with a certain gap from the upper array substrate, laser power of less than one-tenth of the range of 200 μJ to 620 μJ is applied to the defective cell region in forming the comb-like structure with a certain gap between its teeth between the pigment layer and the upper array substrate, laser power of less than one-tenth of the range of 200 μJ to 600 μJ is applied to the defective cell region in processing to generate the black matrix particles, and laser power of less than the one-tenth of the range of 180 μJ to 420 μJ is applied to the defective cell region in order to distribute the black matrix particles into the gaps between the teeth of the comb-like structure of the pigment layer.

7. The method of claim 1, wherein a scanning speed in the laser irradiation is 10 μm/s to 70 μm/s.

8. The method of claim 7, wherein the laser scanning speed applied in the forming of the black matrix with a certain gap from the upper array substrate ranges from 30 μm/s to 70 μm/s, the laser scanning speed applied to the forming of the comb-like structure with a certain gap between its teeth between the pigment layer and the upper array substrate ranges from 20 μm/s to 50 μm/s, the laser scanning speed applied to process the black matrix ranges from 25 μm/s to 45 μm/s, and the laser scanning speed applied to disperse the black matrix particles so as to be distributed into the gaps between the teeth of the comb-like structure of the pigment layer ranges 20 μm/s to 45 μm/s.

9. The method of claim 1, further comprising:
destroying the alignment layer of the defective cell after the dispersing the black matrix particles so as to be distributed to the entire defective cell region.

10. The method of claim 9, wherein if laser irradiated to the defective cell region is red, it has a wavelength range of 500 nm to 550 nm, if the laser is blue and green, it has a wavelength range of 300 nm to 400 nm.

11. The method of claim 9, wherein, laser power of less than one-tenth of the range of 100 µJ to 470 µJ is applied to the defective cell region in forming the black matrix with a certain gap from the upper array substrate, laser power of less than one-tenth of the range of 200 µJ to 620 µJ is applied to the defective cell region in forming the comb-like structure with a certain gap between its teeth between the pigment layer and the upper array substrate, laser power of less than one-tenth of the range of 200 µJ to 600 µJ is applied to the defective cell region in processing to generate the black matrix particles, and laser power of less than one-tenth of the range of 180 µJ to 420 µJ is applied to the defective cell region in order to distribute the black matrix particles into the gaps between the teeth of the comb-like structure of the pigment layer.

12. The method of claim 9, wherein, the first laser irradiation starts from an edge of an upper portion of the black matrix and horizontally proceeds to a lower edge of the black matrix through the defective region, the second laser irradiation starts from the edge of the upper portion of the pigment layer and horizontally proceeds to the lower edge of the pigment layer.

13. The method of claim 9, wherein, the third laser irradiation first starts from one portion of the edge of a lower portion of the black matrix and horizontally proceeds to one portion of the edge of an upper portion of the black matrix through the defective cell region, the third laser irradiation secondly starts from one portion of a lower edge of the left portion of the black matrix and vertically proceeds to the right edge of the black matrix through the entire defective cell region, and the third laser irradiation thirdly starts from the right edge of the upper portion of the black matrix and horizontally proceeds to the left edge of the black matrix through the defective cell region.

14. The method of claim 9, wherein, the fourth laser irradiation first starts from the center of the defective cell region and vertically proceeds to a right side interface with black matrix, the fourth laser irradiation secondly starts from the black matrix adjacent to the right edge of the defective cell region and vertically proceeds to the right edge of the black matrix, the fourth laser irradiation thirdly starts from the center of the defective cell region and vertically proceeds to the left interface with the black matrix, and the fourth laser irradiation fourthly starts from the black matrix adjacent to the left edge of the defective cell region and vertically proceeds to the left edge of the black matrix.

15. The method of claim 1, wherein ultraviolet (UV) light source of wavelength range of 300 nm to 400 nm is irradiated in destroying the alignment layer.

16. The method of claim 1, wherein, the first laser irradiation starts from an edge of an upper portion of the black matrix and horizontally proceeds to a lower edge of the black matrix through the defective region, the second laser irradiation starts from the edge of the upper portion of the pigment layer and horizontally proceeds to the lower edge of the pigment layer.

17. The method of claim 1, wherein, the third laser irradiation first starts from one portion of the edge of a lower portion of the black matrix and horizontally proceeds to one portion of the edge of an upper portion of the black matrix through the defective cell region, the third laser irradiation secondly starts from one portion of a lower edge of the left portion of the black matrix and vertically proceeds to the right edge of the black matrix through the entire defective cell region, and the third laser irradiation thirdly starts from the right edge of the upper portion of the black matrix and horizontally proceeds to the left edge of the black matrix through the defective cell region.

18. The method of claim 1, wherein, the fourth laser irradiation first starts from the center of the defective cell region and vertically proceeds to a right side interface with black matrix, the fourth laser irradiation secondly starts from the black matrix adjacent to the right edge of the defective cell region and vertically proceeds to the right edge of the black matrix, the fourth laser irradiation thirdly starts from the center of the defective cell region and vertically proceeds to the left interface with the black matrix, and the fourth laser irradiation fourthly starts from the black matrix adjacent to the left edge of the defective cell region and vertically proceeds to the left edge of the black matrix.

19. The method of claim 1, further comprising:
attaching a polarizer to the liquid crystal panel.

\* \* \* \* \*